(12) United States Patent
Mercure

(10) Patent No.: US 9,709,113 B2
(45) Date of Patent: Jul. 18, 2017

(54) SAFETY ACTUATION MECHANISM FOR TRAILER ELECTRIC DRUM BRAKE

(71) Applicant: Roger Mercure, Terrebonne (CA)

(72) Inventor: Roger Mercure, Terrebonne (CA)

(73) Assignee: Roger Mercure, Terrebonne, Quebec (CA)

( * ) Notice: Subject to any disclaimer, the term of this patent is extended or adjusted under 35 U.S.C. 154(b) by 0 days.

(21) Appl. No.: 14/407,316

(22) PCT Filed: Jun. 12, 2013

(86) PCT No.: PCT/CA2013/050443
§ 371 (c)(1),
(2) Date: Dec. 11, 2014

(87) PCT Pub. No.: WO2013/185226
PCT Pub. Date: Dec. 19, 2013

(65) Prior Publication Data
US 2015/0159713 A1    Jun. 11, 2015

Related U.S. Application Data

(60) Provisional application No. 61/658,565, filed on Jun. 12, 2012.

(51) Int. Cl.
*F16D 65/22*        (2006.01)
*B60T 7/20*         (2006.01)
(Continued)

(52) U.S. Cl.
CPC ............. *F16D 65/22* (2013.01); *B60T 7/20* (2013.01); *B60T 13/746* (2013.01);
(Continued)

(58) Field of Classification Search
CPC .......... F16D 65/22; F16D 51/22; F16D 51/28; F16D 59/00; F16D 59/02; F16D 2125/28;
(Continued)

(56) References Cited

U.S. PATENT DOCUMENTS 2,676,225 A   4/1954  Jubell
2,887,183 A   5/1959  Ross
(Continued)

FOREIGN PATENT DOCUMENTS

| | | |
|---|---|---|
| GB | 1265078 A | 3/1972 |
| GB | 2429046 A | 2/2007 |
| WO | 9738880 A1 | 10/1997 |

*Primary Examiner* — Melanie Torres Williams
(74) *Attorney, Agent, or Firm* — Norton Rose Fulbright Canada LLP

(57) ABSTRACT

An electric drum brake comprises a back plate. Shoes are operatively mounted to the backplate and displaceable to a deployed condition against a wheel drum from a retracted condition. An electrically powered actuation mechanism is adapted to convert electric power to a movement of the shoes to the deployed condition. A safety actuation mechanism comprises a lever having a first end adapted to receive a mechanical force. A joint configuration connects the lever to at least one of the shoes to convert movements of the lever to movements of at least one of the shoes between the deployed condition and the retracted condition without said electric power. A biasing member produces a biasing action against at least one of the lever and the joint configuration to maintain the shoes in the deployed condition, the mechanical force being against the biasing action to maintain the shoes in the retracted condition.

12 Claims, 5 Drawing Sheets

(51) Int. Cl.
- *B60T 13/74* (2006.01)
- *F16D 51/22* (2006.01)
- *B62D 63/06* (2006.01)
- *B62D 63/08* (2006.01)
- *F16D 51/28* (2006.01)
- *F16D 121/14* (2012.01)
- *F16D 121/18* (2012.01)
- *F16D 125/28* (2012.01)

(52) U.S. Cl.
CPC ........... *B62D 63/062* (2013.01); *B62D 63/08* (2013.01); *F16D 51/22* (2013.01); *F16D 51/28* (2013.01); *F16D 2121/14* (2013.01); *F16D 2121/18* (2013.01); *F16D 2125/28* (2013.01)

(58) Field of Classification Search
CPC ...... F16D 2121/18; B60T 7/20; B60T 13/746; B62D 63/08

USPC ..... 188/110, 111, 112 R, 324, 329, 330, 163
See application file for complete search history.

(56) References Cited

U.S. PATENT DOCUMENTS

| | | | | |
|---|---|---|---|---|
| 3,085,662 A | * | 4/1963 | Binder | .......................... 188/164 |
| 3,106,265 A | * | 10/1963 | Driesch | .................. F16D 49/16 188/171 |
| 3,114,440 A | * | 12/1963 | Perrotto | .................... B60T 1/04 188/152 |
| 3,666,060 A | * | 5/1972 | Schroter | ................. B60T 7/206 188/112 R |
| 4,066,996 A | | 1/1978 | Davis | |
| 2009/0314590 A1 | * | 12/2009 | Dagh | ....................... B60T 7/12 188/110 |

* cited by examiner

SAFETY ACTUATION MECHANISM FOR TRAILER ELECTRIC DRUM BRAKE

FIELD OF THE APPLICATION

The present application relates to trailers such as domestic trailers and, more particularly, to a safety brake system used when trailers are unhitched or accidentally detached from a vehicle to block the wheels of the trailer.

BACKGROUND OF THE ART

Large trailers, such as those used in the freight industries, are equipped with braking systems in order to ensure that the tractor and trailer combination has enough braking power to safely transit on roads. Some trailers are commonly equipped with air brakes that are actuated from the tractor, which air brakes automatically lock the wheels of the trailer when the latter is unhitched.

Smaller trailers, for instance domestic trailers or trailers used to tow recreational vehicles (e.g., boat, motorcycle, ATV, etc.) may have brake systems. For instance, electric drum brakes are commonly used in smaller trailers. In a drum brake, shoes (a.k.a., pads) press against a rotating drum-shaped part called a brake drum. The brake drum rotates, as part of the wheel. In order to apply the braking power to the drum brake, an electromagnetic magnet is powered to activate a displacement of the shoes into contact with the drum.

Accordingly, an electric current must be supplied to the electric drum brake to apply the brakes. When the trailer is unhitched, the electric drum brake may often be disconnected from the power source of the vehicle. Accordingly, random masses (e.g., log, plank, rock) are often wedged behind the wheels of the trailer so as to block movement of the trailer. This action of wedging is hazardous. Moreover, if the operator forgets to wedge a mass behind the wheels, the trailer might start moving if it is on a slope. With the inertia of the trailer and its contents, a moving trailer is hard to stop and may cause severe damages and/or injuries.

Hence, a safety brake system has been developed to address this issue, and is described in PCT application publication no. WO 2010/096934. The safety brake system detects an unhitched condition of the trailer and produces a mechanical force to apply the brakes in response thereto. However, in electric drum brakes, an electric current must be supplied to apply the brakes, which electric current may not be available due to the unhitching of the trailer from the vehicle. Moreover, electric drum brakes may not be configured to receive electric current for an extended period (e.g., parked trailer). This would require a continuous supply of power and batteries of suitable capacity.

SUMMARY OF THE APPLICATION

It is therefore an aim of the present disclosure to provide a safety brake system that addresses issues associated with the prior art.

Therefore, in accordance with the present application, there is provided an electric drum brake comprising: a back plate; shoes operatively mounted to the backplate and displaceable to a deployed condition against a wheel drum from a retracted condition; an electrically powered actuation mechanism adapted to convert electric power to a movement of the shoes to the deployed condition; and a safety actuation mechanism comprising a lever having a first end adapted to receive a mechanical force, a joint configuration connecting the lever to at least one of the shoes to convert movements of the lever to movements of at least one of the shoes between the deployed condition and the retracted condition without said electric power, and a biasing member producing a biasing action against at least one of the lever and the joint configuration to maintain the shoes in the deployed condition, the mechanical force being against the biasing action to maintain the shoes in the retracted condition.

Further in accordance with the present disclosure, the joint configuration comprises a shaft integrally connected to a second end of the lever on a rear side of the back plate to move therewith, the shaft passing through a hole in the back plate for the joint configuration to connect to at least one of the shoes and transmit movements of the lever to at least one of the shoes.

Still further in accordance with the present disclosure, the joint configuration comprises a cam link integrally connected to the shaft, the cam link being connected to a first one of the shoes by an interface link, the interface link being rotatably connected to the cam link and the shoe.

Still further in accordance with the present disclosure, a brake shoe interface is rotatably mounted to the shaft and connected to a second one of the shoes by a rotational joint, and further wherein a dimension of the hole is selected to allow translation of the shaft relative to a plane of the back plate, a translation of the shaft causing said movement of the shoe by transmission via the brake shoe interface.

Still further in accordance with the present disclosure, said interface link and the rotational joint are positioned on generally opposite sides of the shaft.

Still further in accordance with the present disclosure, a support bracket is secured to a rear face of the back plate, the support bracket comprising a cable stop to form an abutment for a cable housing enclosing a cable adapted to be connected to the first end of the lever for transmitting the mechanical force, the mechanical force being a pull from said cable.

Still further in accordance with the present disclosure, the support bracket further comprises an abutment to which a first end of the biasing member is connected, a second end of the biasing member being connected to the lever.

Still further in accordance with the present disclosure, a support bracket is secured to a rear face of the back plate, the support bracket comprising lever stops positioned on opposite sides of the lever to delimit movements of the lever.

Still further in accordance with the present disclosure, the joint configuration and lever of the safety actuation mechanism are separate from the electrically powered actuation mechanism.

Still further in accordance with the present disclosure, the electrically powered actuation mechanism comprises an electromagnet connected to linkages to convert said electric power to the movement of the shoes to the deployed condition.

Still further in accordance with the present disclosure, a trailer comprises at least an axle; a wheel with a drum mounted to the axle to rotate therewith; and the electric drum brake as described above, wherein the axle passes through a hole in the back plate.

Still further in accordance with the present disclosure, a safety brake system has a cable applying the mechanical force when the trailer is in an unhitched condition.

DESCRIPTION OF THE PREFERRED EMBODIMENTS

Figure 1:
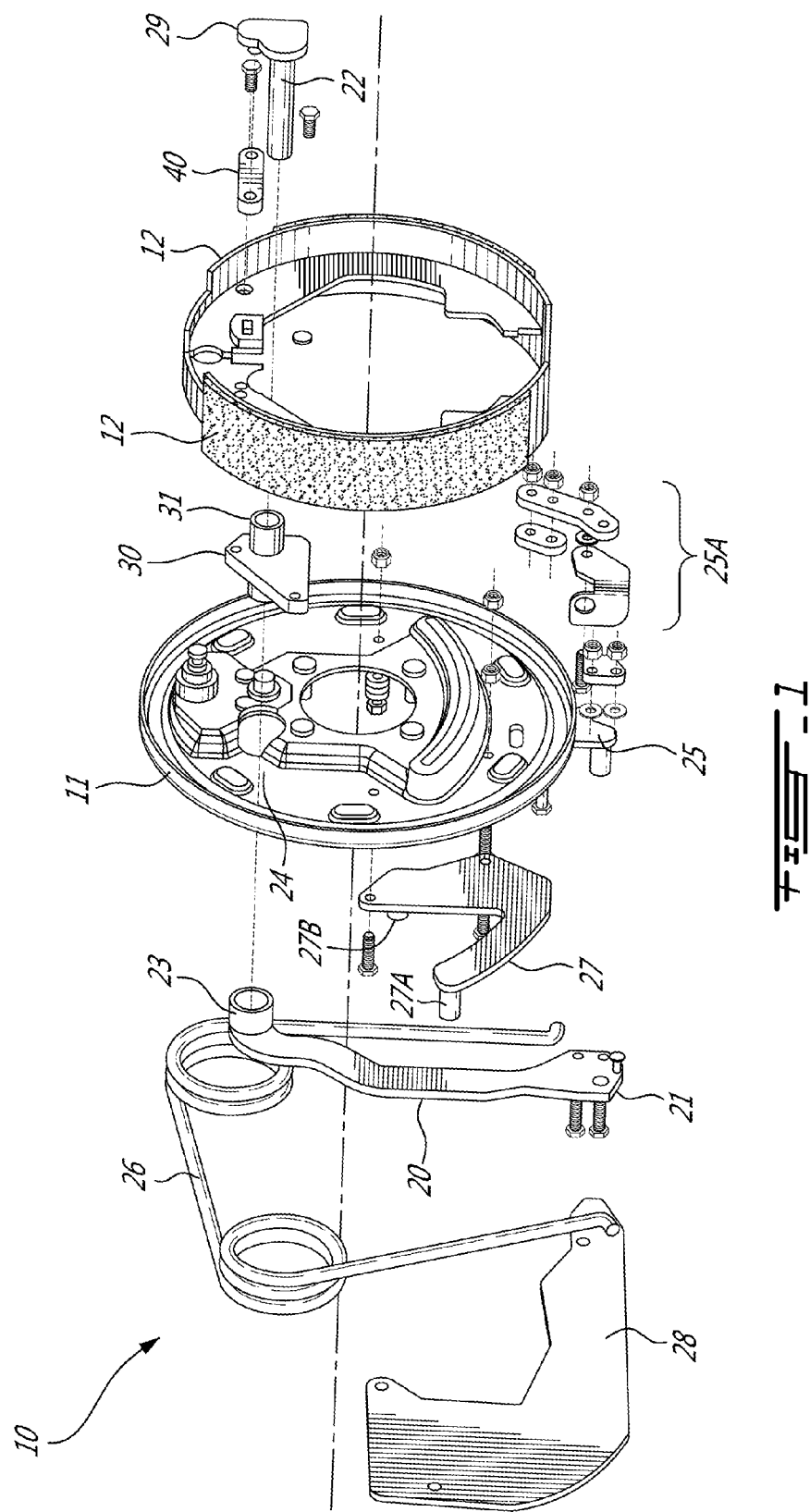
FIG. 1 is an assembly view of an electric drum brake assembly with a safety actuation mechanism in accordance with the present disclosure.

Referring to the drawings, and more particularly to FIG. 1, there is illustrated an electric drum brake assembly at 10. The electric drum brake assembly 10 comprises a safety actuation mechanism that actuates the drum brake when the trailer is in an unhitched condition. For example, the electric drum brake assembly 10 is connected to a safety brake system as described in PCT application publication no. WO 2010/096934, by the current applicant and incorporated herein by reference. This PCT application is one of many published applications by the current applicant, and the electric drum brake assembly 10 may be used with the safety brake systems of any one of the patent applications by the current applicant. Hence, a force in direction F1 is available at the electric drum brake assembly 10, which force is for instance provided by a wire.

Figure 4:
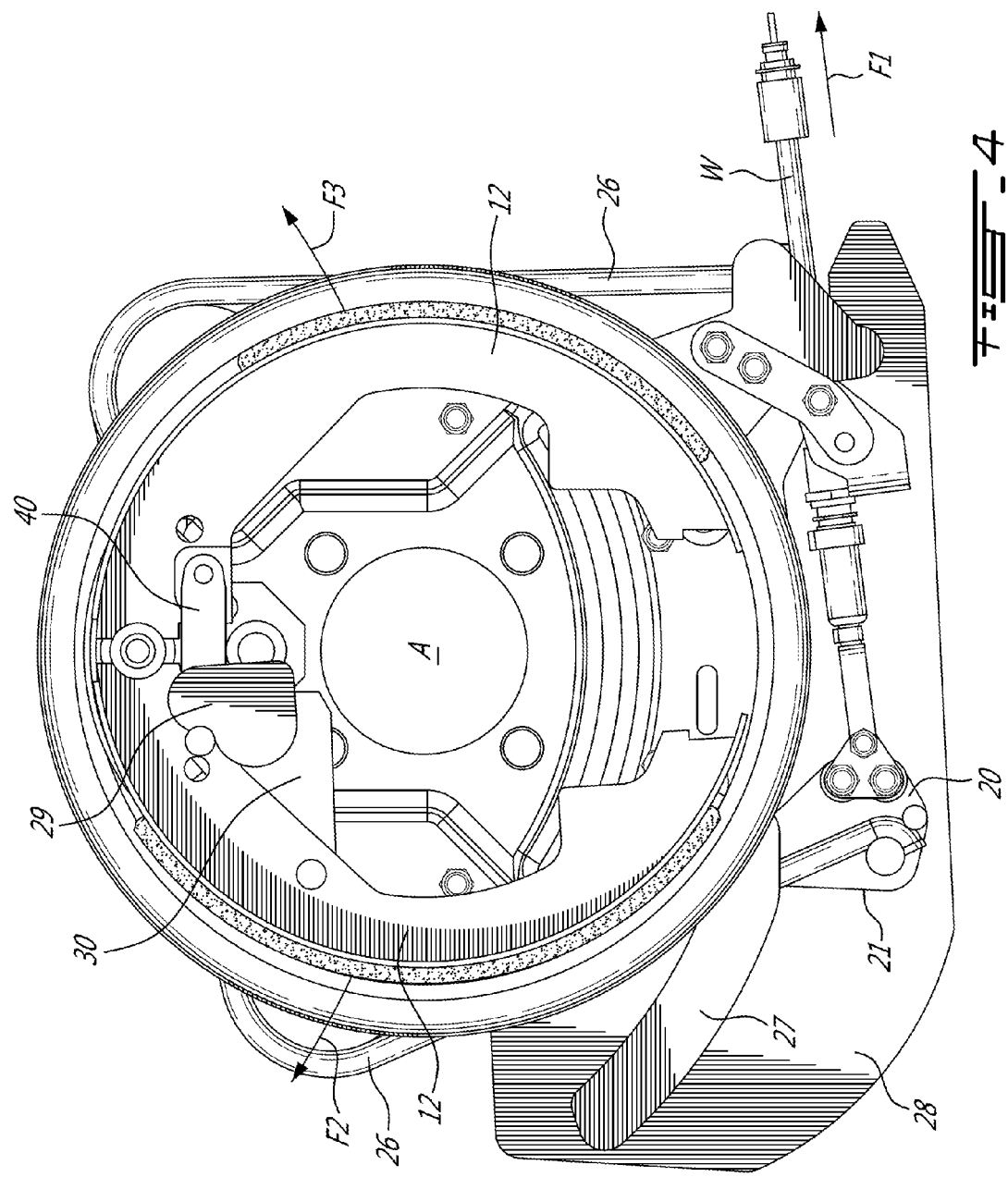
FIG. 4 is a face view of the electric drum brake with safety actuation mechanism of FIG. 1.

Referring to FIGS. 1 and 4, the electric drum brake assembly 10 comprises a back plate 11 (or frame, or structure). The back plate 11 is the structural component of the electric drum brake assembly 10 and hence is in a fixed relation relative to the trailer (i.e., it does not rotate with the wheel). The axle A is part of the trailer and extends through a hole in the back plate 11. Accordingly, a drum of the wheel is secured to the end of the axle A (shown in FIG. 1) projecting beyond the face of the back plate 11.

Figure 5:
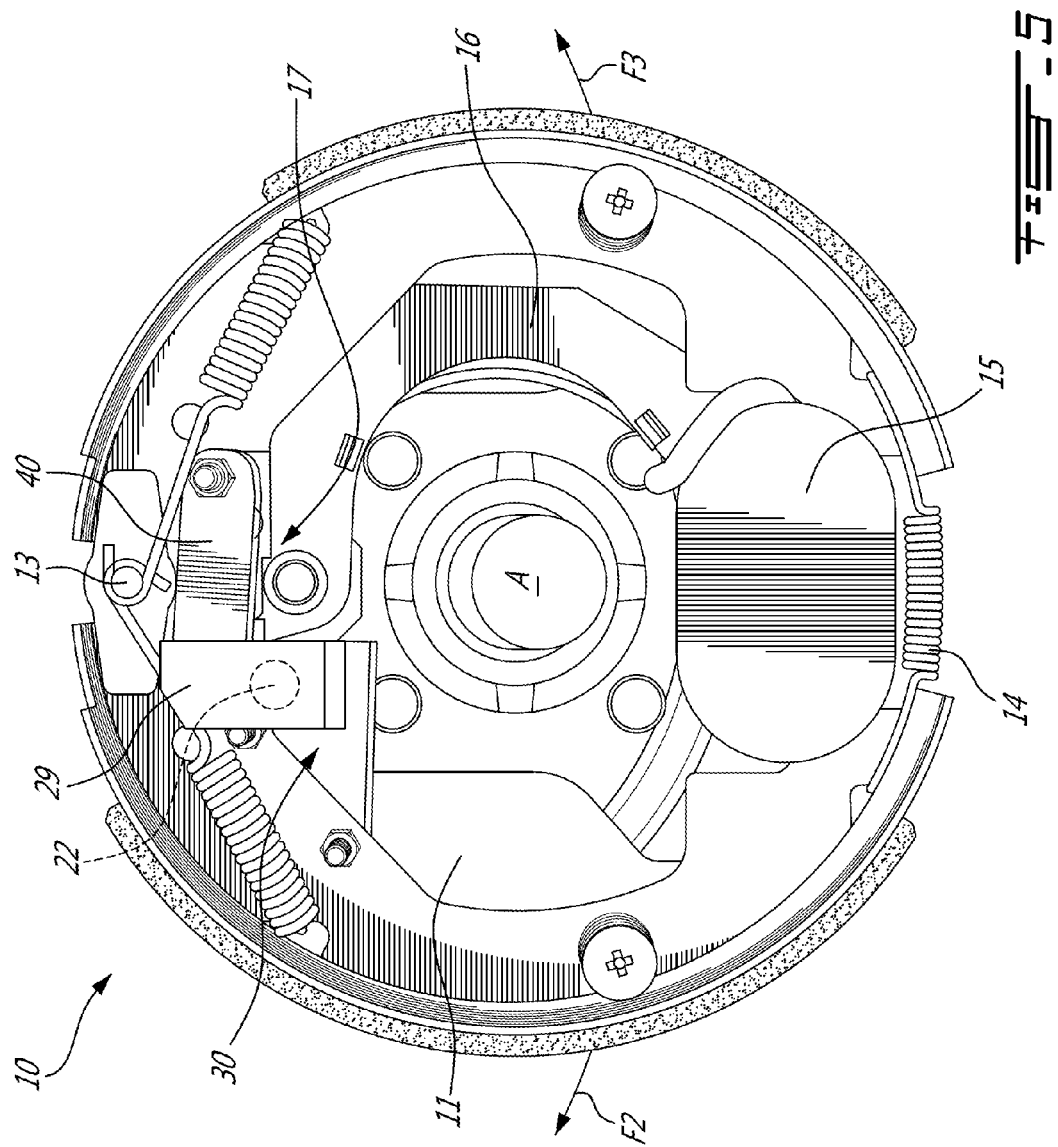
FIG. 5 is a face view of the safety actuation mechanism of FIG. 1 relative to the back plate, with components of the electric drum brake remove.

Referring to FIGS. 1 and 5, shoes 12 are operatively mounted to the back plate 11, and may therefore move outwardly in directions F2 and F3. The shoes 12 may also be known as brake pads and are configured to come in contact with an inner surface of the drum when moved to directions F2 and F3, and hence oppose friction forces against rotational movement of the drum, in a deployed condition. Among other accessories, the electric drum brake assembly 10 may comprise springs 14 (FIG. 5) to bias the shoes 12 toward one another (i.e., brakes not being applied). The electric drum brake assembly 10 comprises an electromagnet 15 that receives an electric current from the towing vehicle or from a power source in the trailer. The electromagnet 15 is connected to a first end of a lever 16 (FIG. 5), while a second end of the lever 16 is connected to a cam mechanism 17 (FIG. 5) or like reciprocal mechanism that will convert a motion of the lever 16 to a movement of the shoes 12 in directions F2 and F3. Accordingly, when the electric current is applied to the electromagnet 15, the lever 16 will be displaced, thereby causing the shoes 12 to move in directions F2 and F3, via mechanism 17.

Referring concurrently to FIGS. 1 to 4, the safety actuation mechanism is used to convert the force from the safety brake system in direction F1 into motion of the shoes 12 in directions F2 and F3. The safety actuation mechanism has a lever assembly. The lever assembly comprises a lever 20 that is positioned on the backside of the back plate 11 (i.e., in the back of the face shown in FIG. 1). A free end 21 of the lever 20 is connected to the safety brake system, illustrated by cable housing W applying force F1. The cable housing W typically encloses a wire of the safety brake system that extends all the way from a trailer tongue to the free end 21 of the lever 20 and therefore transmits/releases a pulling force in direction F1, as described in PCT application publication no. WO 2010/096934.

The opposite end of the lever 20 is connected to a shaft 22. The shaft 22 may be spaced apart from a longitudinal axis of the lever 20 by a bent in the lever 20. The bent may be provided to distance the lever 20 from components projecting from the backside of the back plate 11 (e.g., bolts, etc.). In an embodiment, the lever 20 is connected to the shaft 22 by way of a sleeve 23 receiving the shaft 22 to rotate therewith (e.g., by an appropriate set screw). Thus, the lever 20 and the shaft 22 are integrally connected, so as to move concurrently. The shaft 22 passes through a hole 24 made in the back plate 11. The hole 24 is sized to allow some movement of the shaft 22, in addition to rotational movement, as discussed hereinafter.

Figure 2:
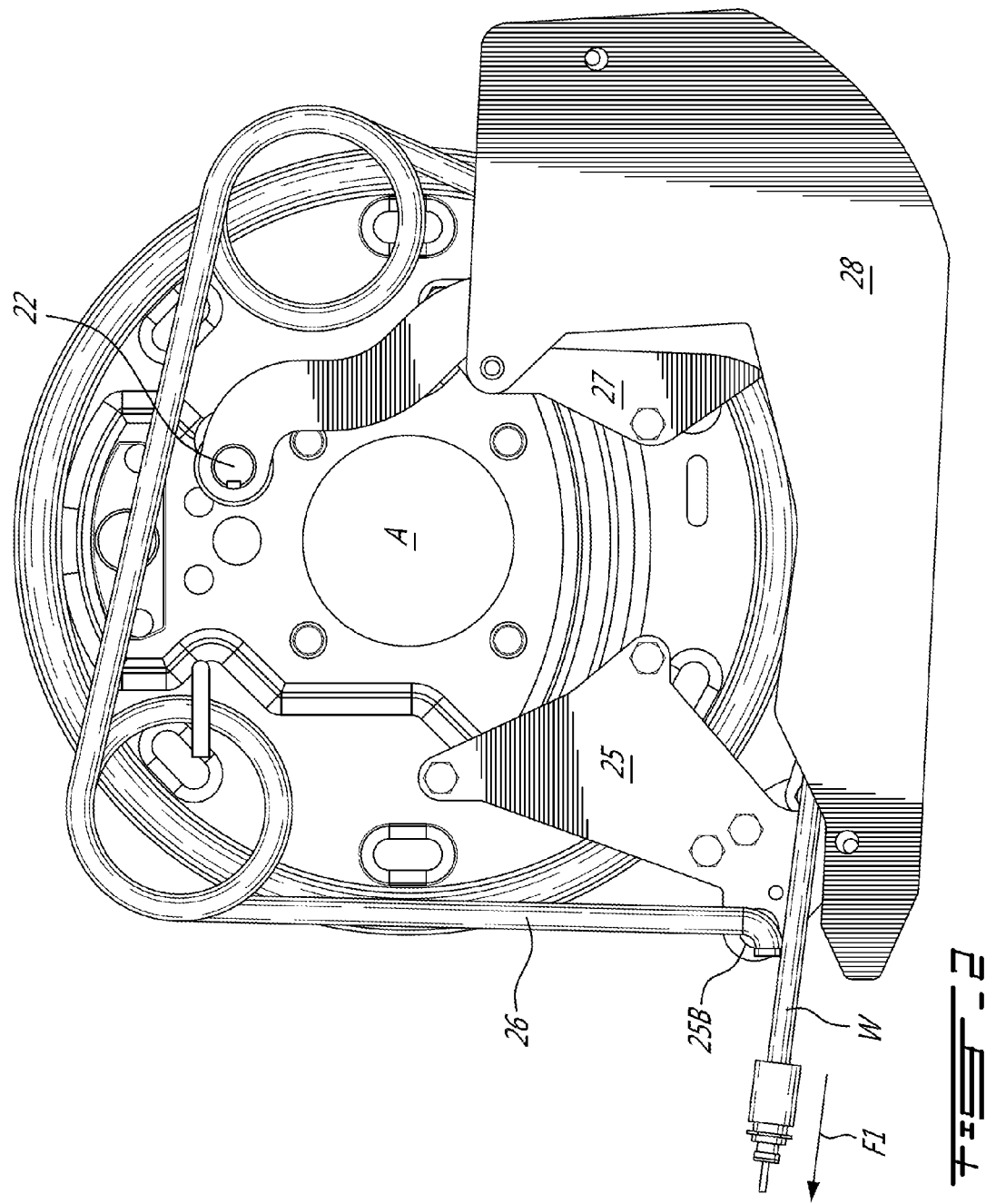
FIG. 2 is a face view of a back plate of the electric drum brake with safety actuation mechanism of FIG. 1, with a shield thereon.
Figure 3:
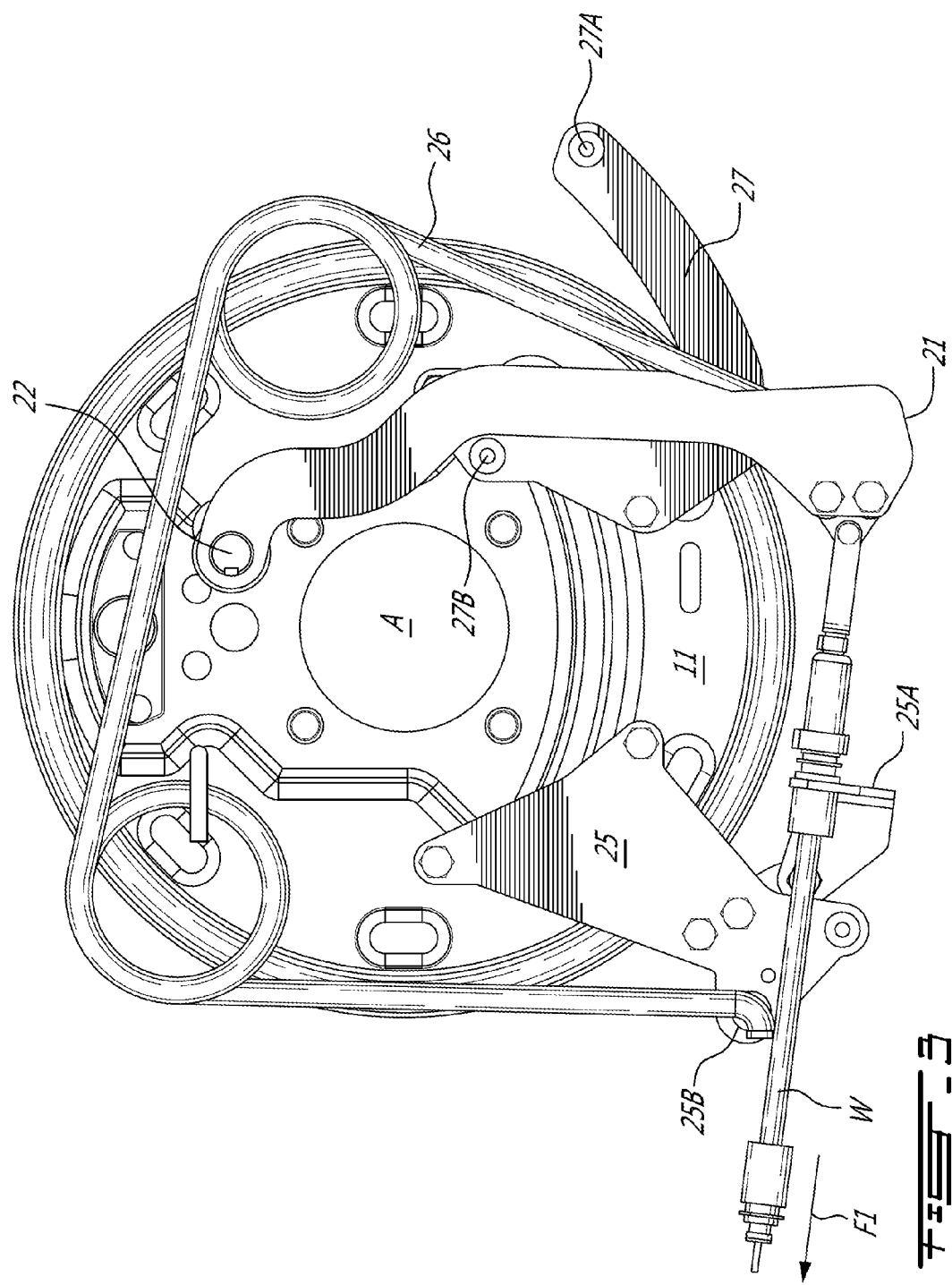
FIG. 3 is a face view of the back plate of the electric drum brake with safety actuation mechanism of FIG. 2, without the shield.

Referring concurrently to FIGS. 2 and 3, a support bracket 25 is connected to the back plate 11, and comprises a cable stop 25A for cable housing W. The bracket 25 further comprises an abutment 25B, to which an end of biasing member 26 is connected. The biasing member 26 is illustrated as being a torsion spring will bias the lever 20 to apply a pull on the wire in the cable housing W, by being connected at a second end to the lever 20. Hence, the spring 26 pressures the free end of the lever 20 away from the cable stop 25A, thereby applying the brakes, as described hereinafter.

Another support bracket 27 is also connected to the back plate 11. The support bracket 27 comprises lever stops 27A and 27B to delimit the range of movements of the lever 20. As shown in FIG. 2, a shield 28 may be used to cover the various components described above, and prevent tampering with the safety actuation mechanism.

Referring to FIGS. 1 and 4, the front face of the back plate 11 is shown. A link 29 is integrally connected to a free end of the shaft 22 so as move therewith, and will act as a cam to cause movement of one of the brake pads, as described hereinafter. It is observed that a rotational axis of the lever assembly relative to the back plate 11 is that of the shaft 22. It is also observed that the rotational axis of the lever assembly is not fixed relative to the back plate 11, as the shaft 22 may translate relative to the hole 24.

A brake shoe interface 30 is integrally connected to one of the shoes 12. According to an embodiment, the brake shoe interface 30 may be bolted, welded or fastened in any appropriate way to the shoe 12, but with a rotational joint being formed. In the illustrated embodiment, screw holes are provided on both the shoe 12 and the brake shoe interface 30. The brake shoe interface 30 comprises a tube 31. The tube 31 has an inner diameter sized so as to rotatingly receive therein the shaft 22. Hence, a rotational joint is formed between the tube 31 and the shaft 22. An end of the tube 31 abuts against an end of the sleeve 23, with either one of the sleeve 23 and the tube 31 being within the hole 24 in the back plate 11. As mentioned previously, the hole 24 is bigger in dimensions than the sleeve 23 and the tube 31, to allow translational movement of the shaft 22 in a plane of the back plate 11 (e.g., X and Y axes in FIGS. 4 and 5), as well as rotational movement about a longitudinal axis of the shaft 22, for two translational degrees of freedom and one rotational degree of freedom.

A further brake shoe interface 40 is pivotally connected to the free end of the link 29 and to the other shoe 12. As the brake shoe interface 40 is positioned one side of the axis of the shaft 22 while the free end 21 of the lever 20 is on the other side, a rotational movement of the free end lever 21 about the shaft 22 results in the brake shoe interface 40 rotating in the other direction, from a vectorial perspective. The brake shoe interface 40 is rotatably mounted to the link 29 and to the show 12.

Now that the various components of the electric drum brake assembly 10 and safety actuation mechanism have been described, an operation thereof to activate the drum brake in a safety condition is set forth, with reference to FIGS. 1-5.

It is firstly assumed that the electric drum brake assembly 10 is not being actuated by electrical current on the electromagnet 15. However, assuming that the trailer is hitched, the safety actuation mechanism does not apply the brakes.

The safety brake system, displaced to an actuation condition, causes a movement of the lever 20. For illustrative purposes, the movement of the lever 20 is by the release of the pulling action of the cable (i.e., away from direction F1), toward a right-hand side of the page in FIGS. 2 and 3. In other words, the cable was pulling in direction F1 to disarm the brakes, but a release in cable tension will result in the spring 26 displacing the lever 20 to the right-hand side of the page for FIGS. 2 and 3. As a result of the movement of the free end 21 of the lever 20, the shaft 22 rotates about its axis and moves in translation along the hole 24 also in the right-hand side of the page in FIGS. 2 and 3, but left-hand side of the page in FIG. 4.

As the tube 31 of the brake shoe interface 30 is on the shaft 22, the brake shoe interface 30 will translate in the same direction as the shaft 22. As the tube 31 forms a rotational joint with the shaft 22, the movement will be transmitted to the brake shoe interface 30 in such a way that same will move the brake shoe 12 in normal unconstrained fashion, outwardly relative to the back plate 11, in direction F2.

On the other hand, the brake shoe interface 40 will convert the rotational movement of the link 29 into a displacement of its respective shoe 12, toward the right-hand side in FIG. 4. The rotational joints formed between the brake shoe interface 40 and both the link 29 and the shoe 12 allow the generally unconstrained transmission of movement from the link 29 to its respective shoe 12, thereby moving the shoe 12 outwardly and into braking contact with the wheel drum.

Although one specific configuration has been shown in FIGS. 1-5, it is considered to use other mechanisms to transmit the force from the safety brake system to the shoes 12. For instance, instead of being integrally connected to its respective shoe 12, the brake shoe interface 30 may be offset from the axis of the shaft 22, and may be pivotally connected to its respective shoe 12 and to the link 29 (e.g., diametrically opposed to the connection point between the link 25 and the brake shoe interface 40). Hence, by the release of the cable tension, the biasing forces provided by the spring 26 will apply the brakes (i.e., will deploy the brake pads 12 against the wheel drum), as the spring 26 biases the lever 20 to the braking position.

It is observed that the safety actuation mechanism described above applies the brakes by way of mechanical forces (i.e., the spring 26), without using electric power for the electromagnet 15. Hence, the safety actuation mechanism will not deplete power sources when actuating the brakes.

In the illustrated embodiment, the safety actuation mechanism applies the brakes in a normal standby position, and a force must be applied against the safety actuation mechanism (e.g., F1) to release the brakes. As discussed above, the force F1 may be a pulling action (although a pushing action could also be used) that results in a safety brake system being displaced to a hitched position of a trailer. The release of the pulling action is hence an unhitched condition, or sectioning of the cable (e.g., in case of theft).

In another embodiment, it is considered to connect the safety brake system directly to the lever 16. One or more of the trailer wheels may have the safety actuation mechanism as described herein. The safety actuation mechanism may be retrofitted onto existing electric drum brake assembly, with the necessary modifications being made to the assembly (e.g., hole in the back plate 11, connection points in the shoes). Also, the safety brake system has no impact on the operation of the electric actuation system of the brake drum assembly 10, as these systems operate independently from one another. It is also considered to have the safety actuation mechanism operate on a single one of the shoes 12.

The invention claimed is:

1. An electric drum brake comprising:
   a back plate;
   shoes operatively mounted to the backplate and displaceable to a deployed condition against a wheel drum from a retracted condition;
   an electrically powered actuation mechanism adapted to convert electric power to a movement of the shoes to the deployed condition; and
   a safety actuation mechanism comprising a lever having a first end adapted to receive a mechanical force, a joint configuration connecting the lever to at least one of the shoes to convert movements of the lever to movements of at least one of the shoes between the deployed condition and the retracted condition without said electric power, and a biasing member producing a biasing action against at least one of the lever and the joint configuration to maintain the shoes in the deployed condition, the mechanical force being against the biasing action to maintain the shoes in the retracted condition.

2. The electric drum brake according to claim 1, wherein the joint configuration comprises a shaft integrally connected to a second end of the lever on a rear side of the back plate to move therewith, the shaft passing through a hole in the back plate for the joint configuration to connect to at least one of the shoes and transmit movements of the lever to at least one of the shoes.

3. The electric drum brake according to claim 2, wherein the joint configuration comprises a cam link integrally connected to the shaft, the cam link being connected to a first one of the shoes by an interface link, the interface link being rotatably connected to the cam link and the shoe.

4. The electric drum brake according to claim 2, further comprising a brake shoe interface rotatably mounted to the shaft and connected to a second one of the shoes by a rotational joint, and further wherein a dimension of the hole is selected to allow translation of the shaft relative to a plane of the back plate, a translation of the shaft causing said movement of the shoe by transmission via the brake shoe interface.

5. The electric drum brake according to claim 4 when dependent on claim 3, wherein said interface link and the rotational joint are positioned on generally opposite sides of the shaft.

6. The electric drum brake according to claim 1, further comprising a support bracket secured to a rear face of the back plate, the support bracket comprising a cable stop to form an abutment for a cable housing enclosing a cable adapted to be connected to the first end of the lever for transmitting the mechanical force, the mechanical force being a pull from said cable.

7. The electric drum brake according to claim 6, wherein the support bracket further comprises an abutment to which a first end of the biasing member is connected, a second end of the biasing member being connected to the lever.

8. The electric drum brake according to claim 1, further comprising a support bracket secured to a rear face of the back plate, the support bracket comprising lever stops positioned on opposite sides of the lever to delimit movements of the lever.

9. The electric drum brake according to claim 1, wherein the joint configuration and lever of the safety actuation mechanism are separate from the electrically powered actuation mechanism.

10. The electric drum brake according to claim 1, wherein the electrically powered actuation mechanism comprises an electromagnet connected to linkages to convert said electric power to the movement of the shoes to the deployed condition.

11. A trailer comprising:
at least an axle;
at least one wheel with a drum mounted to the axle to rotate therewith; and
the electric drum brake for said at least one wheel according to claim 1, wherein the axle passes through a hole in the back plate.

12. The trailer according to claim 11, further comprising a safety brake system having a cable applying the mechanical force when the trailer is in an unhitched condition.

* * * * *